(12) United States Patent
Van Blerkom

(10) Patent No.: US 8,610,046 B2
(45) Date of Patent: Dec. 17, 2013

(54) IMAGE READOUT CIRCUIT WITH CAPACITOR THAT IS SHARED BETWEEN SAMPLE AND HOLD AND BUFFER

(75) Inventor: Daniel A. Van Blerkom, Ahadena, CA (US)

(73) Assignee: Forza Silicon Corporation, Pasadena, CA (US)

( * ) Notice: Subject to any disclaimer, the term of this patent is extended or adjusted under 35 U.S.C. 154(b) by 223 days.

(21) Appl. No.: 13/162,220

(22) Filed: Jun. 16, 2011

(65) Prior Publication Data

US 2012/0318963 A1 Dec. 20, 2012

(51) Int. Cl.
*G01J 1/42* (2006.01)
*G03B 7/08* (2006.01)
*H03F 3/08* (2006.01)

(52) U.S. Cl.
USPC .................................. 250/214 P; 250/214 A

(58) Field of Classification Search
USPC ...................................................... 250/214 P
See application file for complete search history.

(56) References Cited

U.S. PATENT DOCUMENTS

| | | | |
|---|---|---|---|
| 5,471,515 A | 11/1995 | Fossum et al. | |
| 5,909,026 A | 6/1999 | Zhou et al. | |
| 6,040,568 A * | 3/2000 | Caulfield et al. | ........... 250/208.1 |
| 6,452,528 B1 | 9/2002 | Mansoorian | |

\* cited by examiner

*Primary Examiner* — Thanh Luu
*Assistant Examiner* — Renee Naphas
(74) *Attorney, Agent, or Firm* — Law Office of Scott C. Harris, Inc.

(57) ABSTRACT

A switched capacitor sample and hold buffer that can be used, for example, in a CMOS image sensor. The switched capacitor sample and hold circuit has large output swings, low noise and reduced capacitor area compared to the traditional switched capacitor approach.

28 Claims, 4 Drawing Sheets

IMAGE READOUT CIRCUIT WITH CAPACITOR THAT IS SHARED BETWEEN SAMPLE AND HOLD AND BUFFER

BACKGROUND

An image sensor array has a plurality of active light-sensing pixels for receiving radiation from a target object arranged in columns and rows. One such CMOS image sensor is described in U.S. Pat. No. 5,471,515.

A column parallel architecture may read out an entire column of these image sensors at a readout time. For example, a sensor row decoder may operate to address rows of pixels.

A column buffer array has multiple buffer cells with each corresponding to a column of the image sensor array. Each column buffer cell receives signals from an addressed active pixel of the pixel array 110 to generate a signal. That signal is induced only based on the received radiation in that pixel.

Each column of the pixel array may have a dedicated readout signal chain and its own analog to digital (A/D) converter. The A/D converter is physically located at an area adjacent to the pixel array to convert the pixels that are from that area. Each row of pixels is read simultaneously into the parallel signal chain. The entire row is then converted to a digital code, in parallel by that A/D converter.

As the pixel pitches become smaller, it becomes increasingly difficult to fit the A/D converter layout into the area that is occupied by the pitch of one pixel column. One possible way of addressing this is to dedicate an A/D converter to multiple columns so that the A/D converter pitch can be multiple columns wide. A possible drawback with this approach, however, is that the pixel voltage will need to be time multiplexed into the shared A/D converter during the row time, thus slowing the conversion.

In operation, the signals are sampled and held, and then driven into the A/D converter in parallel. A buffer amplifier holds and multiplexes the signals to the A/D converter. The buffer amplifier should support a wide output voltage swing in order to maintain the dynamic range of the sensor. Moreover, the buffer amplifier should not attenuate the signal or add noise, since this would also reduce the performance of the sensor. It is also important that the buffer amplifier has a fast response in order to drive multiple pixel voltages into the A/D converter during the row time thus allowing sufficient time for the A/D conversion operation.

A conventional design for the sample and hold buffer is illustrated in FIG. 1. The input voltages are shown as 100, 102 ... 104 and can include any desired number of input voltages, represented by the designation M. Only two input voltage stages are shown in FIG. 1 for simplicity, however, more generally, there can be M of these stages. Each of these input voltages are driven into a capacitor. For example, the input voltage 100 is driven to a capacitor 110. The capacitor also includes connection 122 to a clamping voltage 123. The pixel outputs are connected in parallel to the capacitors, to cause the values in the pixels to be sampled onto the capacitors 110, 111. When the sample and hold switches 125 (SH1) and 126 (SH2) are opened in each of the legs, the voltages are then held on the sample and hold capacitors 110, 111. Hence, these capacitors 110 111 act as sample and hold capacitors.

The sample voltages are then read out and driven into the A/D converter stage 160 via the buffering stage 150, one by one. In order to read out the sampled voltages, the amplifier 150 is first reset to clear the charge on its feedback capacitor 151 by closing the reset switch 152. Then, a capacitor is selected. Capacitor 110 is selected using the select 1 switch (127 in leg 100) and the select 2 switch (122 in leg 100). This puts the clamping voltage on one side of the capacitor and hence transfers the charge to the amplifier stage 150. The amplifier acts to transfer the charge from the selected sample and hold capacitor here 110, to the feedback capacitor 151 in the buffer stage. This effectively copies the sampled voltage to the output, and drives it into the A/D converter stage 160.

SUMMARY

The inventors recognized that this conventional architecture shown in FIG. 1 has the drawback of a small feedback factor, often known as beta. Beta is a measure of how much a change in the output voltages fed back to the input of the amplifier. Smaller feedback factors can lead to higher noise, and can reduce the settling performance.

BRIEF DESCRIPTION OF THE DRAWINGS in the drawings.

DETAILED DESCRIPTION

Figure 2:
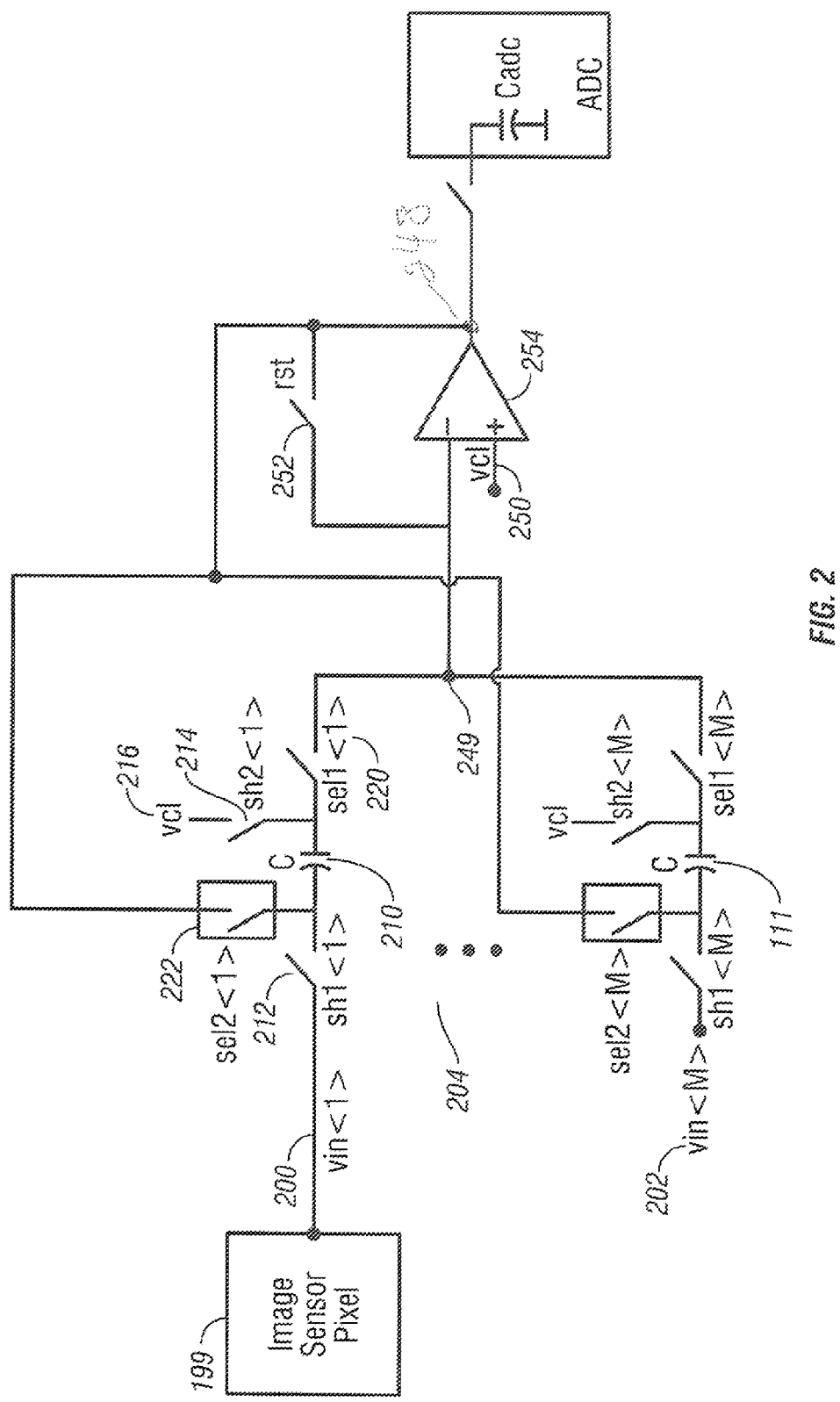
FIG. 2 shows a first embodiment of a buffer that operates without transferring charge.

FIG. 2 shows a block diagram according to an embodiment. According to this embodiment, the same sample and hold capacitor which is used for sampling and holding the signals from the sensor array is reused, with the system reconfiguring the buffer amplifier such that the sample and hold capacitor becomes the feedback capacitor to the buffer amplifier. This embodiment has a number of advantages, including that there is no necessity to transfer the charge from the sample and hold capacitors to the feedback capacitor. Instead, this embodiment uses switches to perform the function by switching the sample and hold capacitor into the feedback loop. This technique can also provide a higher feedback factor, because unlike the conventional architecture, there is no sample and hold capacitor loading down the amplifier input during the hold phase.

In operation, the embodiment of FIG. 2 has a number of legs 200, 202, 204, more generally up to M legs which can be sampled in parallel. The operation will be explained with respect to leg 1 labelled as 200. The reset switch 252 associated with the buffer amplifier is closed between operations, in order to reset any residual charge. In operation, a pixel 199 of the image sensor is connected to the leg 200. The two sample and hold switches 212 (sample and hold 1) and 214 (sample and hold 2) are both then closed. This connects the output of the image sensor pixel 199 to one input of the sampling capacitor 210 in leg 1. At the same time, the other end of the capacitor 210 via switch 214 (sample and hold 2) is connected to the clamping voltage 216. This samples the output of the image sensor pixel 199 onto the sampling capacitor 210. Note that this can be done simultaneously in other legs 200 to 204. In another embodiment, however, the reset level is sampled first into one set of capacitors, then the signal level from each pixel into another set of capacitors . . . . The image sensor pixel 199 is sampled and held by opening the two sample and hold switches, 212 (sample and hold 1), and 214 (sample and hold 2).

In order to convert or buffer the signal, while the sample and hold switches 212, 214 are open, the two select switches 220 (select 1) and 222 (select 2) are closed. This closing the select switch 220 connects one side of the capacitor 210 to the common node 249 that connects to the noninverting input of the amplifier method 254. Closing the second select switch 222 connects the other side of the capacitor to the output/feedback loop of the amplifier 254 via node 248. In this way, the capacitor 210, that is the actual capacitor that sampled and held, is switched into the feedback loop of the amplifier 250.

Figure 1:
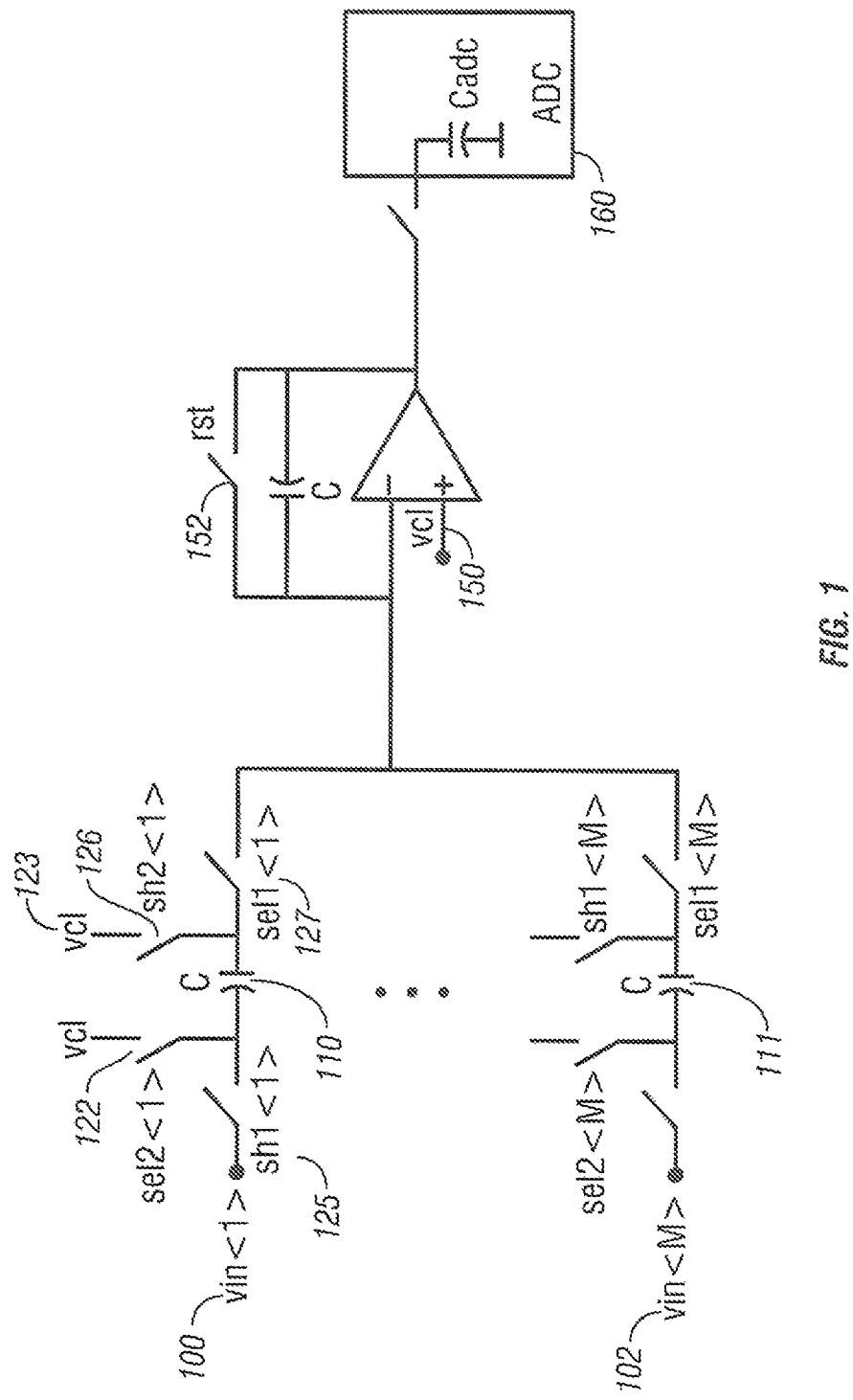
FIG. 1 shows a conventional column parallel readout architecture.

In this embodiment, each of the select 1 switches of each of the legs is commonly connected to the node 249. Each of the select 2 switches, from the other side of the capacitor is commonly connected to the other node 248. By so doing, this reduces the circuit count, by allowing one fewer capacitor in each leg. This also avoids the need to force the charge in from a sampling capacitor to a feedback capacitor as in the FIG. 1 circuit.

The inventors realized that higher dynamic range is obtained when the signal swing that is available in the analog signal chain is maximized. The inventors recognized that the FIG. 2 embodiment may require a wide signal swing in order to maintain proper operation. As the sample and hold capacitor 210 is switched into the feedback position using the switches 220 and 222, the voltage at the top plate of the capacitor is momentarily forced to a negative value as it is connected to the amplifier input node 249. This occurs because the amplifier cannot respond instantaneously to the change in voltage on its input. The voltage drop across the capacitor appears at the input of the amplifier. If this voltage drops below ground level, parasitic diodes on the switch methods will be forward biased, and will discharge some of the charge on the capacitor, thus corrupting the sampled voltage level.

Figure 3:
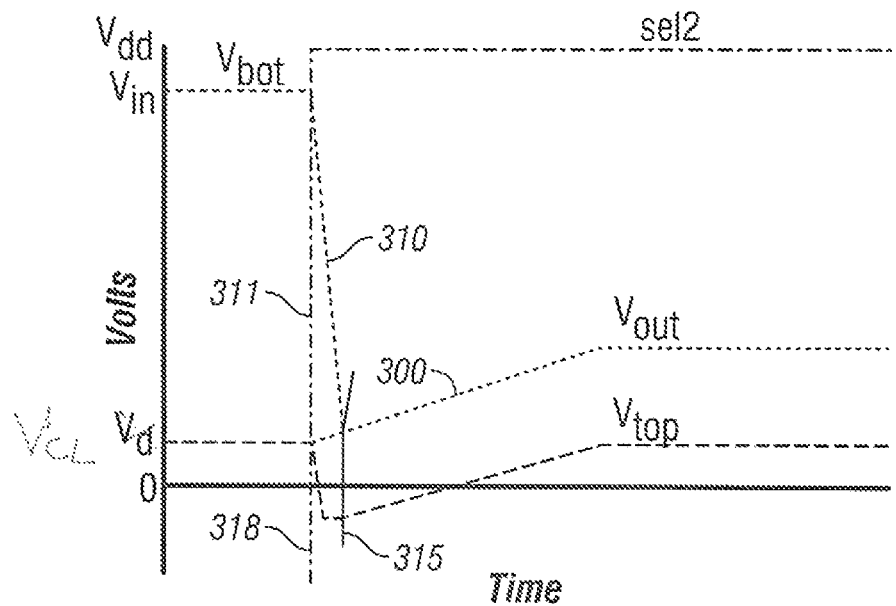
FIG. 3 shows a timing diagram of operation.

FIG. 3 shows this scenario, where the output voltage from the amplifier shown as curve 300 (Vout) does not exactly replicate the input voltage to the sample and hold circuit Vin after the select 2 switch becomes active at 318 as shown in curve 311. The curve 300 shows how charge may be lost when the amplifier input node goes below ground and loses charge due to the forward biasing of the diodes, e.g, between times 315 and 318.

Figure 4:
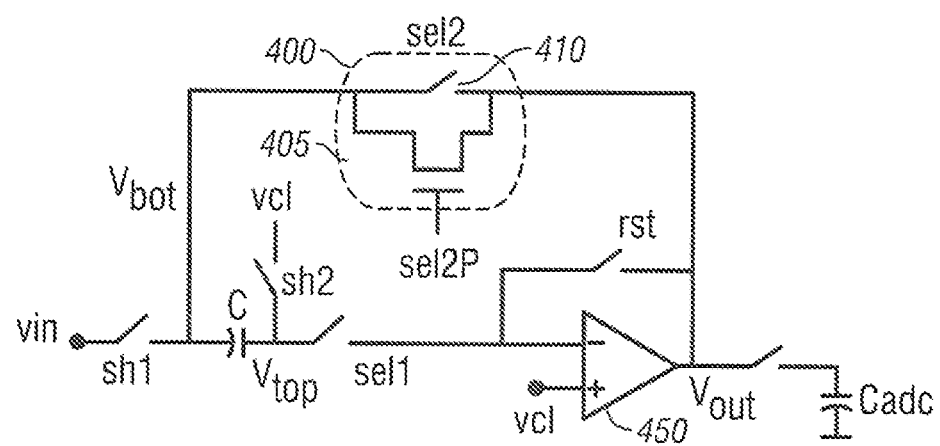
FIG. 4 shows an embodiment using a soft turn-on circuit.
Figure 5:
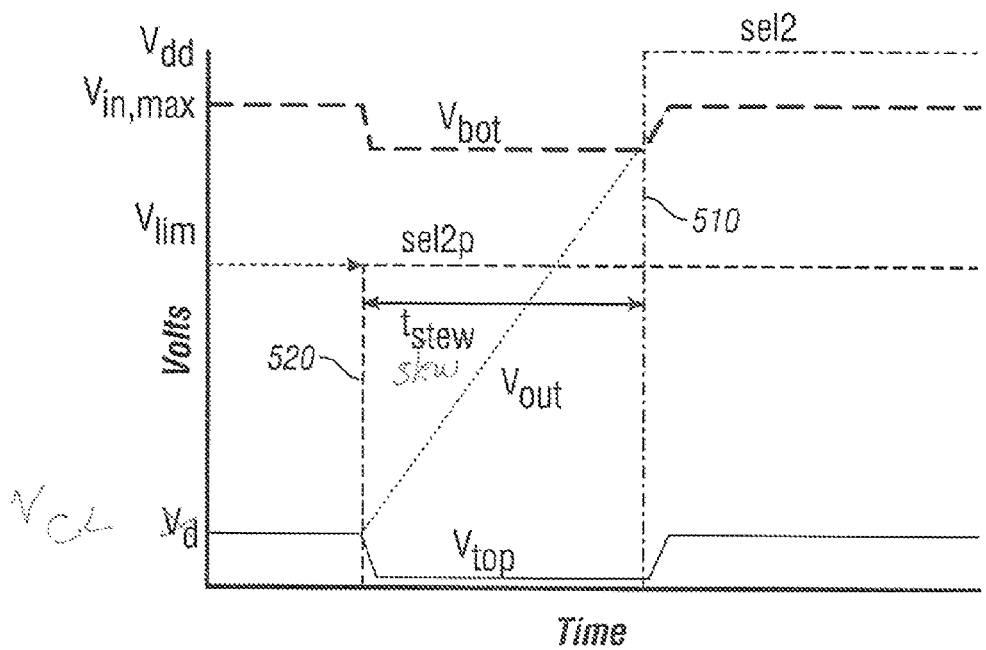
FIGS. 5 and 6 show a timing diagram and circuit for another embodiment.

Therefore, according to another embodiment, shown in FIG. 4, the select switch 2, 222 in FIG. 2 is replaced by a modified select switch 400 which includes an additional switch 405 that may gradually turn on. Here an NMOS switch 405 can be located in parallel with the actual switch method 410. The NMOS method 405 is controlled by a special control voltage sel2$p$ which is shown as 500 in FIG. 5. The control voltage sel2$p$ turns on earlier than the select 2 voltage as also shown in FIG. 5 at 510. The high-voltage level of sel2$p$ is set to the voltage level Vlim which limits the voltage to which the input can drop. It does this by preventing the bottom plate of the capacitor from being forced immediately to the initial output level of the amplifier Vclamp. Instead, holding it in this way allows only a controlled amount of charge to be pulled from the capacitor.

The NMOS method 405 only conducts strongly when the gate is above the source by at least a voltage threshold Vt. When the select signal turns on, Vlim limits the voltage that can be placed on the gate. Initially, Vlim is greater than (Vclamp+Vt) so that this starts to discharge the bottom plate of the capacitor, thus decreasing the voltage on the bottom plate. The top plate follows the bottom plate of the capacitor and thus the voltage input to the converting node of the amplifier also drops. The amplifier responds by rapidly rising the output voltage Vout. When Vout rises above the level of Vlim−Vt, the NMOS method 405 stops conducting which stops the decrease in voltage on the bottom plate of the capacitor. This prevents the voltage on the top plate of the capacitor from falling below ground level. The amplifier continues to slew its output to a higher voltage, since it still sees a positive differential voltage on it's input. When the maximum slewing time T slew has completed, the second select switch 410 is turned on, thereby allowing the voltages to settle to their final value. However, by turning on the switching slowly, the charge is not lost, as could happen in the FIG. 2 embodiment.

Figure 6:
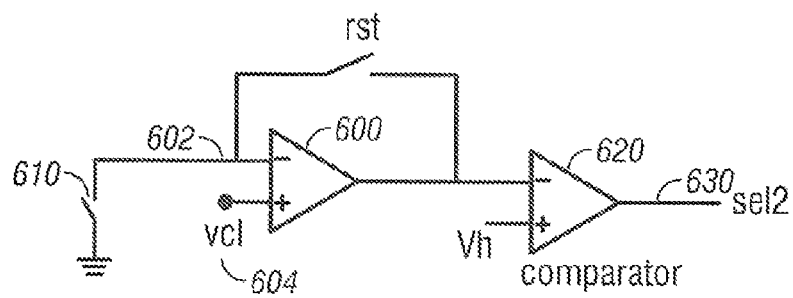

The slewing time tslew can be generated on the chip by using a replica circuit as shown in FIG. 6. The replica circuit includes an amplifier 600 which is the same amplifier as the circuit amplifier 450 in FIG. 4. The inputs 602, 604 to the amplifier can be driven to positive differential voltage at the start of the pulse by closing the switch 610 at the start of the pulse. Then, a comparator circuit 620 at the output of the replica amplifier 600 triggers when the amplifier output rises to a value equal to Vin-max−Vclamp. This indicates that the selected switch can be closed at this time, so the output 630 can control the select to switch.

Other embodiments can simulate the time in different ways, for example using a controller that is on-chip, or using any other kind of circuit.

The buffer amplifiers of any of these embodiments can be arrayed to provide multiple analog signal chains in column wise fashion for any image sensor. The control signals can be shared for all of the buffer amplifiers in the array.

According to another embodiment, spare NMOS gates that are in the select 2 switch can be used to create the special switch 405 instead of a separate NMOS method. Also, more simplified simulations circuits other than the simulation circuit of FIG. 6 can be used.

Another embodiment is to use a PMOS method instead of an NMOS method. In this case, the sel2$p$ signal will switch between Vdd and Vlim, instead of 0V and Vlim. In this case, the PMOS method does not allow the bottom plate of the capacitor to drop below approximately Vlim+|Vt|, as below this voltage the PMOS method will turn off.

As above, spare PMOS gates could be used to create the special PMOS switch described above, instead of a separate PMOS method.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example this method and circuit can be used in other kinds of image sensor parts.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic method, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external methods (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing methods, e.g., a combination of a DSP and a microprocessor, a plurality of microprocessors, one or more microprocessors in conjunction with a DSP core, or any other such configuration. These methods may also be used to select values for methods as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage methods, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage methods. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An image readout device, comprising:
a connection to at least one pixel output receiving a pixel output from an image sensor, said connection including a sample and hold capacitor which is used for sampling and holding the pixel output, said sample and hold capacitor including first and second terminals;
a buffer amplifier, connected to buffer and amplify said pixel output; and
a circuit reconfiguration element which reconfigures the connection such that the same sample and hold capacitor which is used for sampling and holding signals from the image sensor is reused as a part of said buffer amplifier by switching both the first and second terminals of the sample and hold capacitor into a feedback loop of the buffer amplifier.

2. An image readout device as in claim 1, wherein said sample and hold capacitor is used to sample and hold the pixel output, and is also switched into a feedback loop of the buffer amplifier.

3. A device as in claim 2, further comprising a turn on circuit, that connects the sample and hold capacitor into said feedback loop in different stages of turn on, with each stage having a defined voltage to current transfer function, to avoid losing charge from the sample and hold capacitor when said sample and hold capacitor is switched into said feedback loop.

4. The device as in claim 3, wherein said sample and hold capacitor is connected to a node of said buffer amplifier, and said turn on circuit is turned on in said stages that avoid the amplifier node being biased to a level below ground.

5. The device as in claim 3, wherein said turn on circuit allows only a specified amount of charge to be released from the capacitor per unit time.

6. The device as in claim 3, wherein said turn on circuit operates to match a specified slew time.

7. The device as in claim 6, further comprising an auxiliary circuit that simulates a slew time to find a simulated slew time, and using said simulated slew time to determine a speed of turn on a said turn on circuit.

8. The device as in claim 7, wherein said sample and hold and buffer amplifier are formed on a chip, and said auxiliary circuit is also formed on the chip.

9. A device as in claim 8, further comprising a plurality of additional readout connections, buffer amplifiers, and circuit reconfiguration elements, also formed on said chip.

10. The device as in claim 7, wherein said auxiliary circuit simulates a slew time which replicates the buffer amplifier slew time.

11. An image readout device, comprising:
a sample and hold capacitor which is used for sampling and holding a pixel output from a pixel of an image sensor, said sample and hold capacitor including first and second terminals;
a buffer amplifier, connected to buffer and amplify said pixel output; and
a switch which switches both said first and second terminals of the sample and hold capacitor between a first configuration where it samples and holds said pixel output and a second configuration where it is used in a feedback loop of the buffer amplifier.

12. An image readout device, comprising:
sample and hold capacitor is used for sampling and holding a pixel output from a pixel of an image sensor;
buffer amplifier, connected to buffer and amplify said pixel output; and
a switch which switches the sample and hold capacitor between a first configuration where it samples and holds said pixel output and a second configuration where it is used as a part of the buffer amplifier, wherein said sample and hold capacitor is used to sample and hold the pixel output, and is also switched into a feedback loop of the buffer amplifier.

13. A device as in claim 12, wherein said switch includes a turn on circuit, that gradually connects the sample and hold capacitor into said feedback loop in different stages of turn on, with each stage having a defined voltage to current transfer function to avoid losing charge from the sample and hold capacitor when said sample and hold capacitor is switched into said feedback loop.

14. The device as in claim 13, wherein said sample and hold capacitor is connected to a node of said buffer amplifier, and said turn on circuit is turned on in stages to avoid the amplifier node being biased to a level below ground.

15. The device as in claim 14, wherein said turn on circuit allows only a specified amount of charge to be released from the capacitor per unit time.

16. The device as in claim 14, wherein said turn on circuit operates to match a specified slew time.

17. The device as in claim 16, further comprising an auxiliary circuit that simulates a slew time a simulated slew time, and using said simulated slew time to determine a speed of turn on a said turn on circuit.

18. The device as in claim 17, wherein said sample and hold and buffer amplifier are formed on a chip, and said auxiliary circuit is also formed on the chip.

19. A device as in claim 18, further comprising a plurality of additional readout connections, buffer amplifiers, and circuit reconfiguration elements, also formed on said chip.

20. The device as in claim 17, wherein said auxiliary circuit simulates a slew time which replicates the buffer amplifier slew time.

21. An image readout method, comprising:
sampling and holding a pixel output from a pixel of an image sensor on to a sample and hold capacitor that has first and second terminals;
switching both said first and second terminals of the sample and hold capacitor, with charge thereon from said sampling and holding, into a feedback loop of a buffer amplifier to use the charge in said sample and hold capacitor in said buffer amplifier, to produce an output indicative of said pixel output.

22. A method as in claim 21, further comprising connecting the sample and hold capacitor into said circuit configuration of said buffer amplifier using a turn on circuit that avoids losing charge from the sample and hold capacitor when said sample and hold capacitor is connected into said circuit configuration.

23. The method as in claim 22, wherein said connecting allows only a specified amount of charge to be released from the capacitor per unit time.

24. The method as in claim 22, wherein said connecting operates to match a specified slew time.

25. The method as in claim 21, wherein said sample and hold capacitor is connected to a node of said buffer amplifier, and said connecting turns on in stages to avoid the amplifier node being biased to a level below ground.

26. An image readout method, comprising:
sampling and holding a pixel output from a pixel of an image sensor on to a sample and hold capacitor;
switching the sample and hold capacitor, with charge thereon from said sampling and holding, into a circuit configuration of a buffer amplifier to use the charge in said sample and hold capacitor in said buffer amplifier, to produce an output indicative of said pixel output; and
switching again said sample and hold capacitor, out of said circuit configuration of said buffer amplifier, to again receive a second pixel output indicative of different information from said image sensor, wherein said switching comprises switching into a feedback loop of the buffer amplifier.

27. An image readout method, comprising:
sampling and holding a pixel output from a pixel of an image sensor on to a sample and hold capacitor;
switching the sample and hold capacitor, with charge thereon from said sampling and holding, into a circuit configuration of a buffer amplifier to use the charge in said sample and hold capacitor in said buffer amplifier, to produce an output indicative of said pixel output; and
switching again said sample and hold capacitor, out of said circuit configuration of said buffer amplifier, to again receive a second pixel output indicative of different information from said image sensor, connecting the sample and hold capacitor into said circuit configuration of said buffer amplifier using a turn on circuit that avoids losing charge from the sample and hold capacitor when sample and hold capacitor is connected into said circuit configuration, wherein said slow turn on circuit operates at a specified slew time; and using an auxiliary circuit form simulating a slew time that will avoid a node of said buffer amplifier being biased to a level below ground in to find a simulated slew time, and using said simulated slew time to determine a speed of turn on of said connecting.

28. The method as in claim 27, wherein said sample and hold and buffer amplifier are formed on a chip, and said auxiliary circuit is also formed on the chip.

* * * * *